United States Patent
Kinomura et al.

(10) Patent No.: US 9,188,054 B2
(45) Date of Patent: Nov. 17, 2015

(54) CONTROL DEVICE FOR A VEHICLE THAT INCLUDES A THERMOWAX SWITCHING VALVE

(75) Inventors: Shigeki Kinomura, Shizuoka-ken (JP); Osamu Shintani, Toyota (JP); Taro Furukoshi, Toyota (JP); Atsushi Komada, Nisshin (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 976 days.

(21) Appl. No.: 13/384,526

(22) PCT Filed: Dec. 4, 2009

(86) PCT No.: PCT/JP2009/070427
§ 371 (c)(1),
(2), (4) Date: Jan. 17, 2012

(87) PCT Pub. No.: WO2011/067861
PCT Pub. Date: Jun. 9, 2011

(65) Prior Publication Data
US 2012/0111956 A1    May 10, 2012

(51) Int. Cl.
*G05D 23/02* (2006.01)
*F01P 7/16* (2006.01)
*G05D 23/19* (2006.01)

(52) U.S. Cl.
CPC ............ *F01P 7/167* (2013.01); *G05D 23/1921* (2013.01); *F01P 2025/32* (2013.01); *F01P 2070/04* (2013.01)

(58) Field of Classification Search
CPC ............. F01P 7/16; F01P 7/161; F01P 7/167; F01P 2070/04; G05D 23/1921
USPC .................. 236/93 A, 93 R, 99 J, 99 K, 99 R
See application file for complete search history.

(56) References Cited

U.S. PATENT DOCUMENTS

| | | | | |
|---|---|---|---|---|
| 6,223,700 B1 * | 5/2001 | Sano | ....................... | F01P 7/167 123/41.02 |
| 2005/0006487 A1 * | 1/2005 | Suda | ....................... | F01P 7/167 236/46 R |

FOREIGN PATENT DOCUMENTS

| | | |
|---|---|---|
| JP | 63-183216 A | 7/1988 |
| JP | 2005-188327 A | 7/2005 |
| JP | 2008-133772 A | 6/2008 |
| JP | 2008-208716 A | 9/2008 |
| JP | 2009-115075 A | 5/2009 |
| JP | 2009-150364 A | 7/2009 |

OTHER PUBLICATIONS

JP 2005-188327 (English Translation).*
Information Search Report of PCT/JP2009/070427, dated Feb. 9, 2010.
Translation of International Preliminary Report on Patentability for corresponding International Patent Application No. PCT/JP2009/070427.

* cited by examiner

*Primary Examiner* — Jonathan Bradford
(74) *Attorney, Agent, or Firm* — Sughrue Mion, PLLC

(57) ABSTRACT

An electronic control unit (12) calculates the heat receiving quantity of a thermo wax to estimate the temperature of the thermo wax on the basis of the calculated heat receiving quantity and the heat capacity of the thermo wax, and controls a heater so that the temperature of the thermo wax reaches a predetermined target value. Further, the electronic control unit (12) changes the value of the heat capacity used to estimate the temperature of the thermo wax depending on the variation of the estimated temperature of the thermo wax across the phase transition point of the thermo wax so as to preferably control a switching valve which is operated by heating the thermo wax.

11 Claims, 10 Drawing Sheets

(Warm-up Initial Stage)

(Warm-up Latter Stage)

(After Completion of Warm-up)

CONTROL DEVICE FOR A VEHICLE THAT INCLUDES A THERMOWAX SWITCHING VALVE

CROSS REFERENCE TO RELATED APPLICATION

This application is a National Stage of International Application No. PCT/JP2009/070427 filed Dec. 4, 2009, the contents of all of which are incorporated herein by reference in their entirety.

FIELD OF THE DISCLOSURE

The present invention relates to a control device for a vehicle that includes a thermowax switching valve, which has a heating section for heating thermowax and is selectively opened and closed by melting and solidification of the thermowax.

BACKGROUND OF THE DISCLOSURE

A thermowax switching valve is often employed as a valve for switching the flow of fluid in a fluid circuit such as a coolant circuit of a water-cooled engine. The thermowax switching valve is selectively opened and closed by expansion and contraction accompanying melting and solidification of the thermowax sealed inside of a case. A heater for heating the thermowax is often provided to force such a thermowax switching valve to open as needed.

A control device for a vehicle including such a thermowax switching valve with a heater has been proposed as disclosed in Patent Document 1. The vehicle disclosed in Patent Document 1 includes the above-mentioned thermowax switching valve in a hydraulic circuit of the engine, and a PTC heater for heating the thermowax of the switching valve.

The control device for a vehicle disclosed in Patent Document 1 includes an oil temperature sensor that detects the oil temperature in the hydraulic circuit, and estimates the temperature of the thermowax based on the oil temperature detected by the oil temperature sensor. When opening the switching valve, the PTC heater keeps being energized until a sensor value of the oil temperature sensor becomes higher than the melting temperature of the thermowax.

PRIOR ART DOCUMENT

Patent Document

Patent Document 1: Japanese Laid-Open Patent Publication No. 2009-115075

SUMMARY OF THE INVENTION

Problems that the Invention is to Solve

As described above, the conventional control device for a vehicle includes the temperature sensor that detects the temperature of fluid flowing around the switching valve, and estimates the temperature of the thermowax based on the sensor value of the temperature sensor. However, in particular, in a case where the temperature sensor and the switching valve are arranged apart from each other, the sensor value of the temperature sensor and the temperature of the thermowax might be different. If the temperature of the thermowax is underestimated, the thermowax is undesirably heated more than necessary, and a rubber seal and grease inside the switching valve might deteriorate due to carbonization.

Accordingly, it is an objective of the present invention to provide a control device for a vehicle that controls a switching valve, which is operated by heating a thermowax, in a suitable manner.

Means for Solving the Problems

To achieve the foregoing objective, the present invention provides a control device for a vehicle. The vehicle includes a thermowax switching valve, which includes a heating section for heating thermowax and is selectively opened and closed by melting and solidification of the thermowax. The control device includes a control section that controls the heating state of the heating section while taking into account variation of the thermal capacity accompanying phase transition of the thermowax.

In the above-mentioned thermowax switching valve including the heating section, there is correlation between the opening degree and the thermowax temperature. By estimating the thermowax temperature, and controlling the heating state of the heating section based on the estimated temperature, the thermowax is heated without deficiency or excess. The thermowax temperature can be estimated based on a thermal model of the thermowax. In this case, the thermal capacity of the thermowax needs to be obtained accurately.

Operation of the thermowax switching valve involves phase transition of the thermowax, and the phase transition involves variation of the thermal capacity of the thermowax. Thus, when estimating the thermowax temperature using the above-mentioned thermal model and controlling the heating state of the heating section based on the estimated result, it is necessary to consider the variation of the thermal capacity accompanying the phase transition of the thermowax. In this respect, according to the above-mentioned configuration, the heating state of the heating section is controlled taking into account the variation of the thermal capacity accompanying the phase transition of the thermowax. Thus, the heating state of the heating section is controlled while accurately grasping the thermowax temperature. According to the above structure, the switching valve operated by heating the thermowax is controlled in a suitable manner.

To achieve the foregoing objective, the present invention provides another control device for a vehicle. The vehicle includes a thermowax switching valve, which includes a heating section for heating thermowax and is selectively opened and closed by melting and solidification of the thermowax. The control device includes a target value setting section, a wax temperature estimating section, and a control section. The target value setting section sets a target value of the temperature of the thermowax. The wax temperature estimating section computes the amount of heat received by the thermowax based on the amount of heat transferred from the heating section to the thermowax and the amount of heat transferred from the thermowax to a fluid around the switching valve, and which estimates the temperature of the thermowax based on the amount of heat received and the thermal capacity of the thermowax. The control section controls the heating section such that the estimated temperature of the thermowax becomes equal to the target value. The wax temperature estimating section changes the value of the thermal capacity in accordance with variation of the estimate temperature of the thermowax across phase transition points of the thermowax.

The amount heat received by the thermowax in the above-mentioned thermowax switching valve is calculated as a value obtained by dividing the amount of heat transferred from the heating section to the thermowax by the amount of heat transferred from the thermowax to the fluid around the switching valve. By dividing the amount of heat received by the thermowax by its thermal capacity, the amount of variation of the thermowax temperature is obtained, and the thermowax temperature can be calculated based on the result. The opening and closing of the thermowax switching valve involves phase transition of the thermowax from the solid phase to the solid-liquid coexisting phase and the liquid phase. The thermal capacity of the thermowax is changed in accordance with the phase transition. In this respect, in the present invention, the value of the thermal capacity is changed in accordance with variation of the estimate temperature of the thermowax across the phase transition points of the thermowax, and the thermowax temperature is estimated using the thermal capacity appropriate for the phase transition of the thermowax. Thus, in the control device for a vehicle according to the present invention, the thermowax temperature is accurately determined, and control of the switching valve operated by heating the thermowax is performed in a suitable manner.

In a case where the heating section is controlled based on the estimate temperature of the thermowax as described above, the target value of the thermowax temperature when there is a request for opening the switching valve is preferably set to the temperature less than or equal to the thermowax temperature at which the switching valve is fully opened, that is, to the thermowax temperature at which the switching valve is fully opened or the temperature slightly lower than that to avoid overheating of the thermowax by the heating section.

Also, when the switching valve is abruptly opened, the temperature of the fluid flowing around the switching valve is rapidly changed, and might interfere with the control based on the fluid temperature. In such a case also, the switching valve is gradually opened and the rapid temperature change of the fluid is prevented by holding the target value to the thermowax temperature at which the switching valve has a minute opening degree for a certain period of time, and then setting the target value to the thermowax temperature at which the switching valve is fully opened.

To further ensure the operation response of the switching valve from the valve closed state to the valve opened state, the thermowax temperature of the switching valve while being closed is preferably preheated. Such preheating is performed by setting the target value when the switching valve is closed to a value at which the amount of heat received by the thermowax becomes greater than "0", and that is lower than the temperature at which valve opening of the switching valve is started.

To further ensure the operation response of the switching valve from the valve closed state to the valve opened state, the thermowax temperature of the switching valve while being closed is preferably kept at the temperature that exists immediately before the switching valve starts to open. Therefore, the response of the switching valve when opening the valve is ensured by setting the target value of the thermowax temperature while the switching valve is closed to a value corresponding to a temperature of the thermowax that exists immediately before the opening of the switching valve is started.

Hysteresis that cannot be ignored might exist in the relationship between the thermowax temperature and the switching valve opening degree. That is, there might be a difference that cannot be ignored between the thermowax temperature at which the switching valve opening degree of a predetermined opening degree X is obtained when the opening degree of the switching valve is being changed in a valve opening direction, and the thermowax temperature at which the switching valve opening degree of a predetermined opening degree X is obtained when the opening degree of the switching valve is being changed in a valve closing direction. In such a case also, the target value of the estimate temperature of the thermowax may be set to different values in the case where the switching valve opening degree is changed in the valve opening direction to achieve the target opening degree, and in the case where the switching valve opening degree is changed in the valve closing direction to achieve the target opening degree even if the target opening degree of the switching valve is the same. In this manner, the opening degree of the switching valve is controlled in a suitable manner.

The thermal capacity of the thermowax of the switching valve might vary from one unit to another due to change with time and individual differences. In such a case, the thermal capacity used to estimate the thermowax temperature might differ from the actual thermal capacity of the thermowax, and the thermowax temperature cannot be accurately estimated. In this case also, by detecting an opened state of the switching valve, and modifying the thermal capacity in accordance with the difference between the estimate temperature of the thermowax when opening of the valve is detected and the thermowax temperature at which the switching valve is actually opened, the variation of the thermal capacity from one unit to another is learned and modified, and the thermowax temperature is accurately estimated.

To easily control the heating section based on the estimate temperature of the thermowax, the thermowax is preferably heated by the heating section when the estimate temperature of the thermowax is lower than the target value, and heating is preferably stopped if such is not the case.

In the above-mentioned thermowax switching valve, if the thermal capacity of the case compared to the thermal capacity of the thermowax cannot be ignored, it is necessary to consider the influence of the thermal capacity of the case in the variation of the thermowax temperature with respect to the amount of heat received. In this situation, as the thermal capacity used to compute the amount of variation of the thermowax temperature, the thermal capacity of the case of the switching valve in combination with and the thermowax is used.

The present invention may be applied to a vehicle equipped with a switching valve located in a coolant circuit that circulates a coolant for the engine. In particular, the present invention is applied to a vehicle including a switching valve that switches between permitting and stopping circulation of the coolant in the engine.

DETAILED DESCRIPTION OF THE PREFERRED EMBODIMENTS

First Embodiment

A control device for a vehicle according to a first embodiment of the present invention will now be described in detail with reference to FIGS. 1 to 10. In this embodiment, the invention is applied to a vehicle including a thermowax switching valve provided in a coolant circuit for circulating engine coolant, wherein the circulation is selectively started and stopped.

Figure 1:
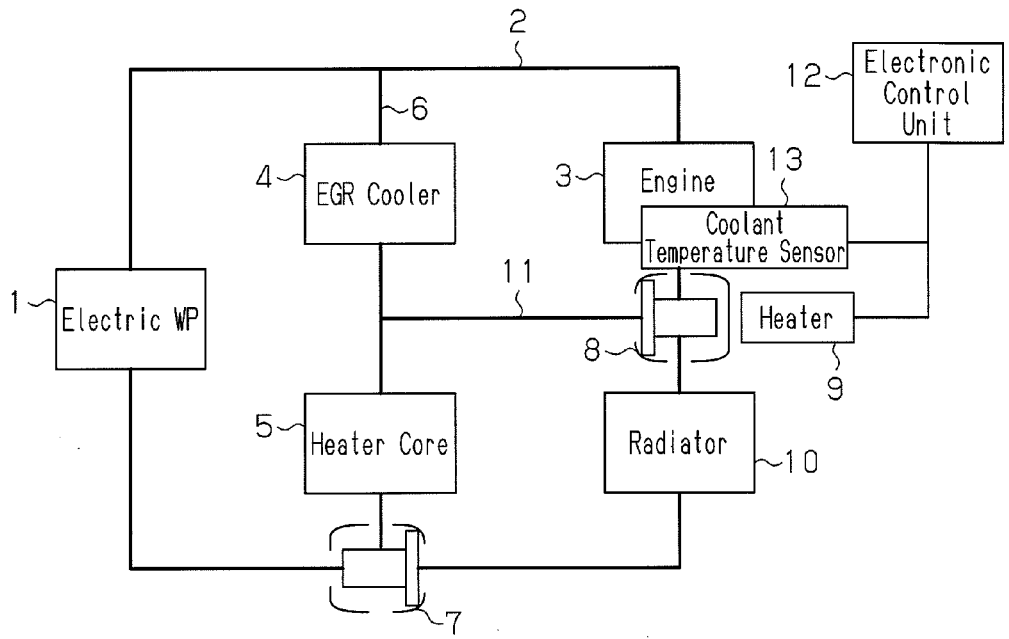
FIG. 1 A schematic block diagram illustrating the configuration of a coolant circuit of a vehicle according to a first embodiment of the present invention.

FIG. 1 shows the configuration of the coolant circuit of the vehicle according to this embodiment. The coolant circuit includes an electric water pump 1 for circulating the coolant.

As shown in FIG. 1, in the coolant circuit, the coolant passage is branched at a section downstream of the electric water pump 1 into a first conduit 2, which passes through an engine 3, and a second conduit 6, which passes through an EGR cooler 4 and a heater core 5. The first conduit 2 is formed to pass through a cylinder block and a cylinder head of the engine 3 in order. The first conduit 2 is connected to a switching valve 8 at a section downstream of the engine 3.

The switching valve 8 is formed as a thermowax-type conduit switching valve, which is selectively opened and closed by melting and solidification of a thermowax. Also, the switching valve 8 includes a heater 9, which serves as a heating section for heating the thermowax in the switching valve 8. After passing through a radiator 10 that transfers heat from the engine coolant at a section downstream of the switching valve 8, the first conduit 2 is connected to a thermostat 7.

The thermostat 7 is selectively opened and closed in accordance with the temperature of the engine coolant that flows around a temperature sensing element inside the thermostat 7. The engine coolant of the second conduit 6 that has passed through the EGR cooler 4 and the heater core 5 flows into the temperature sensing element. The thermostat 7 closes the valve when the temperature of the engine coolant flowing into the temperature sensing element is low, and inhibits the flow of the coolant through the radiator 10. The thermostat 7 opens the valve when the temperature of the engine coolant flowing into the temperature sensing element is high, and permits the flow of the coolant through the radiator 10.

Furthermore, the coolant circuit includes a third conduit 11, which connects part of the second conduit 6 downstream of the EGR cooler 4 to the switching valve 8 in the first conduit 2. The switching valve 8 permits the flow of the coolant through the third conduit 11 by opening the valve, and inhibits the flow of the coolant through the third conduit 11 by closing the valve.

Energization of the heater 9 provided in the switching valve 8 is controlled by an electronic control unit 12. The electronic control unit 12 is configured as a computer unit including a central processing unit (CPU), a read only memory (ROM), a random access memory (RAM), and an input/output port (I/O). In the electronic control unit 12, the CPU executes computation processes associated with the energization control of the heater 9, and the ROM stores programs and data for control. Also, the RAM temporarily stores the computation results of the CPU and the detection results of the sensor. The I/O inputs signals from and outputs signals to external devices.

A coolant temperature sensor 13, which detects the temperature of the engine coolant, is connected to the input port of the electronic control unit 12. The coolant temperature sensor 13 is located in the vicinity of the coolant outlet of the cylinder head of the engine 3.

In the coolant circuit configured as described above, the flow of the engine coolant is controlled in the following manner after the engine 3 is started.

Figure 2:
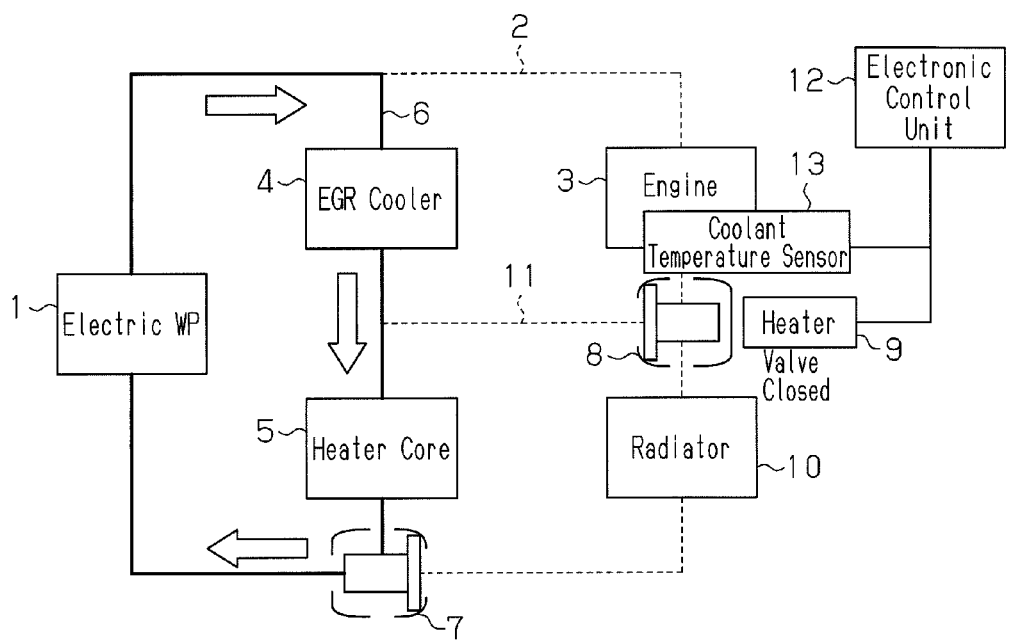
FIG. 2 A block diagram showing circulation of a coolant at a warm-up initial stage in the coolant circuit.

FIG. 2 shows the state of the coolant circuit in a warm-up initial stage. As shown in FIG. 2, the switching valve 8 at this time is closed so that the flow of the engine coolant through the third conduit 11 is stopped. Also, the thermostat 7 at this time is closed and stops the flow of the coolant through the radiator 10 since the temperature of the engine coolant that flows into the temperature sensing element is low. Therefore, the engine coolant is circulated through only the second conduit 6 in the coolant circuit at this time. Circulation of the engine coolant in the engine 3 is stopped, and the engine coolant inside the engine 3 is kept heated by the heat generated by the engine 3. This promotes a temperature increase of the engine coolant inside the engine 3, and thus promotes warming of the engine 3.

Figure 3:
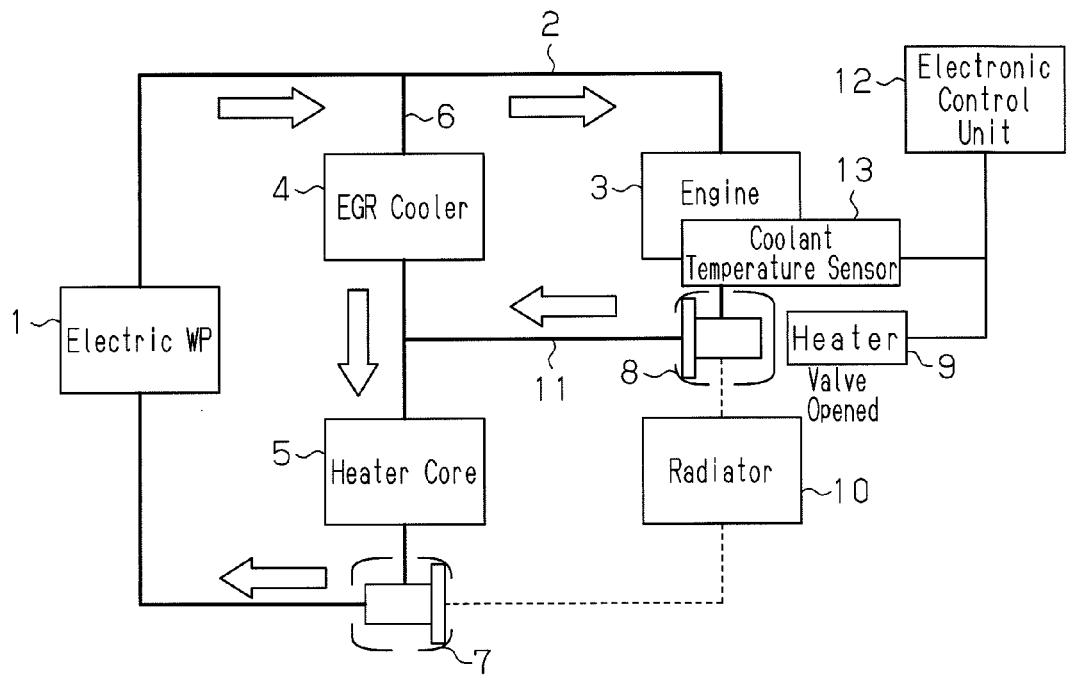
FIG. 3 A block diagram showing circulation of the coolant at a warm-up latter stage in the coolant circuit.

FIG. 3 shows the state of the coolant circuit in a warm-up latter stage. As shown in FIG. 3, the switching valve 8 is open at this time, and permits the flow of the engine coolant through the third conduit 11. The thermostat 7 at this time is still closed, and stops the flow of the coolant through the radiator 10. Thus, in the coolant circuit at this time, the engine coolant that has passed through the engine 3 flows through the third conduit 11, and circulation of the coolant inside the engine 3 is started.

Figure 4:
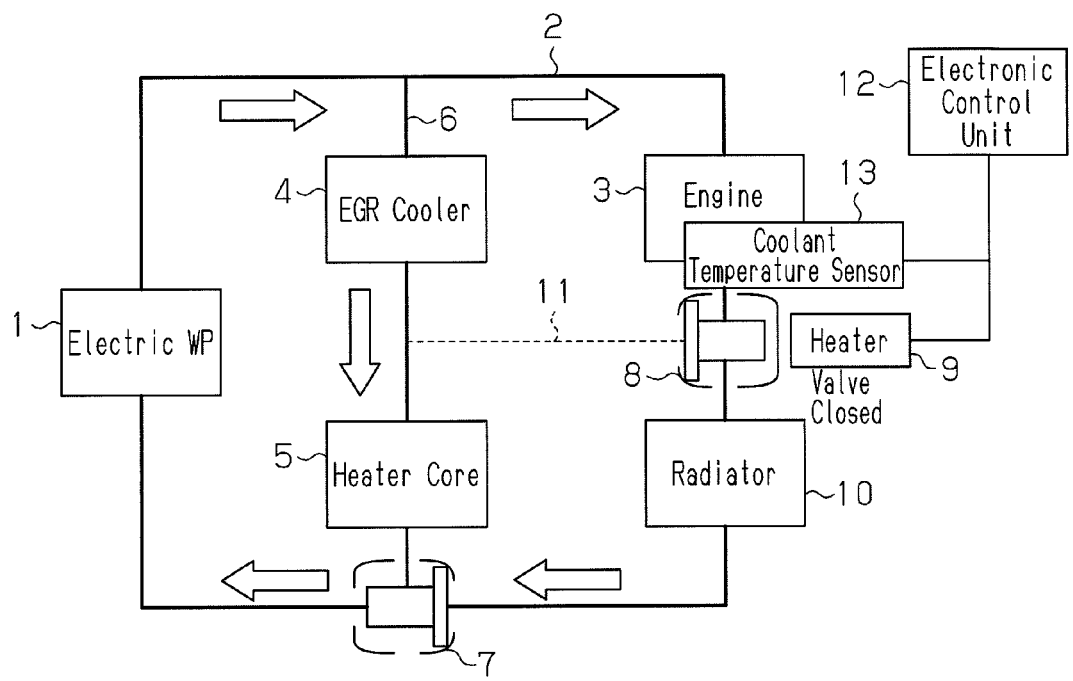
FIG. 4 A block diagram showing circulation of the coolant in the coolant circuit after completing warm-up.

FIG. 4 shows the state of the coolant circuit after completion of warm-up. As shown in FIG. 4, the switching valve 8 at this time is closed, and the flow of the engine coolant through the third conduit 11 is stopped. Since the temperature of the engine coolant that passes through the temperature sensing element is sufficiently increased, the thermostat 7 at this time is opened. Thus, in the coolant circuit at this time, the engine coolant that has passed through the engine 3 flows to the radiator 10, and the heat that the engine coolant absorbed from the engine 3 is transferred by the radiator 10.

In this embodiment, the electronic control unit 12 estimates the thermowax temperature of the switching valve 8 using a thermal model when controlling the opening degree of the switching valve 8. The electronic control unit 12 then controls the opening degree of the switching valve 8 by controlling the heating state of the heater 9 such that the estimated thermowax temperature becomes equal to a target wax temperature.

Figure 5:
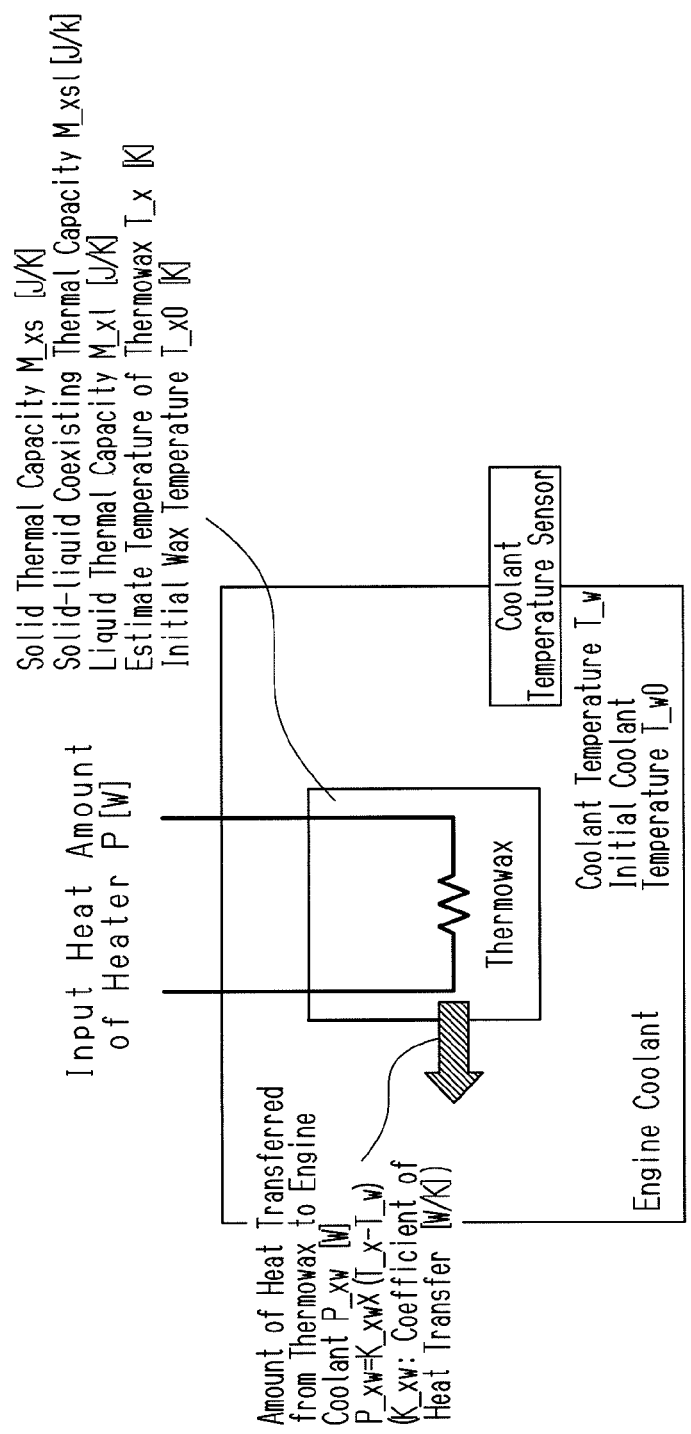
FIG. 5 A schematic diagram illustrating a thermal model of a thermowax used in the first embodiment.

FIG. 5 shows the thermal model used to estimate the thermowax temperature. In the thermal model, the amount of heat received by the thermowax per unit time (P−P_xw) is calculated using the input heat amount P of the heater 9 and the amount of heat P_xw that is transferred from the thermowax to the engine coolant. Further, the amount of temperature variation of the thermowax per unit time is calculated by dividing the amount of heat received by the thermal capacity of the thermowax.

The amount of heat P_xw is calculated as a value obtained by multiplying the difference value (T_x−T_w) between the estimate temperature T_x of the thermowax and the coolant temperature T_w of the engine coolant by the coefficient of heat transfer K_xw from the thermowax to the engine coolant. Also, in this embodiment, a sensor value of the coolant temperature sensor 13 is used as the coolant temperature T_w of the engine coolant used for computing the amount of heat P_xw.

In this physical model, the temperature of the thermowax when starting the engine 3 (initial wax temperature T_x0) is assumed to be equal to the coolant temperature of the engine coolant (initial coolant temperature T_w0). The estimate temperature T_x is obtained by integrating the temperature variation amount per unit time computed based on the amount of heat received (P−P_xw) to the initial wax temperature T_x0.

Selectively opening and closing the thermowax switching valve 8 involves phase transition of the thermowax from a solid phase to a solid-liquid coexisting phase and a liquid phase. The thermal capacity of the thermowax is changed in accordance with the phase transition. In this embodiment, three values including the solid thermal capacity M_xs, the solid-liquid coexisting thermal capacity M_xsL, and the liquid thermal capacity M_XL are prepared as the thermal capacity of the thermowax used to compute the amount of temperature change, and the values are switched in accordance with the state of the thermowax. That is, in this embodiment, the value of the thermal capacity is changed in accordance with the variation of the estimate temperature T_x of the thermowax across the phase transition points of the thermowax.

In this embodiment, the thermal capacities (M_xs, M_xsl, M_xl) are calculated as the thermal capacity of the thermowax of the switching valve 8 in combination with the case for accommodating the switching valve 8. That is, the thermal capacities specifically represent the thermal capacity of the case and the thermowax of the switching valve 8.

Conventionally, it is unnecessary to estimate the temperature using such a model since the thermostat is used in a region with a relative margin. However, the temperature increase of the coolant becomes rapid by stopping water, and it is necessary to estimate the temperature using the abovementioned model to prevent boiling of the coolant.

Figure 6:
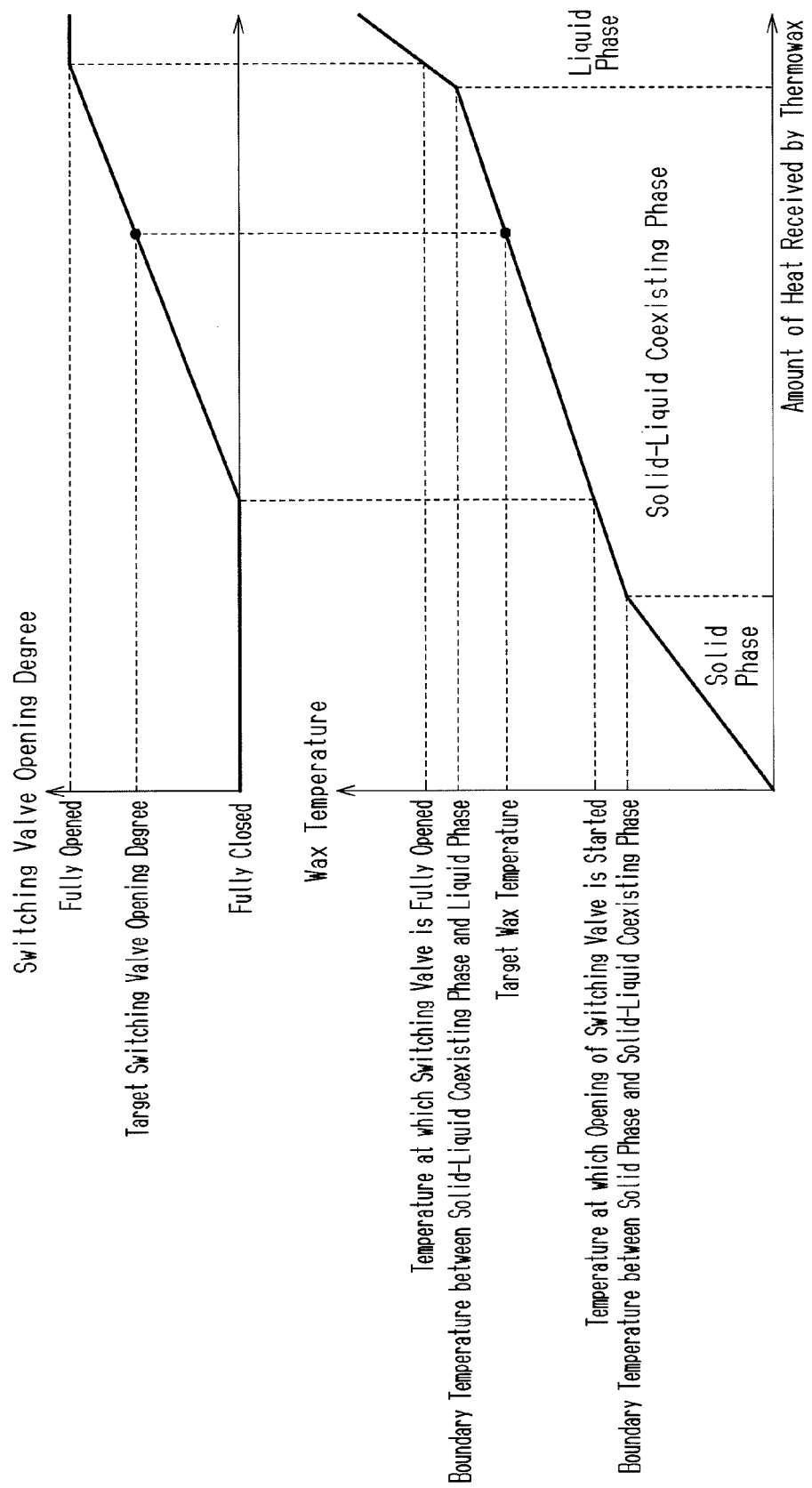
FIG. 6 A graph showing the relationship between the amount of heat received by the thermowax with respect to the wax temperature and the opening degree of the switching valve according to the first embodiment.
Figure 7:
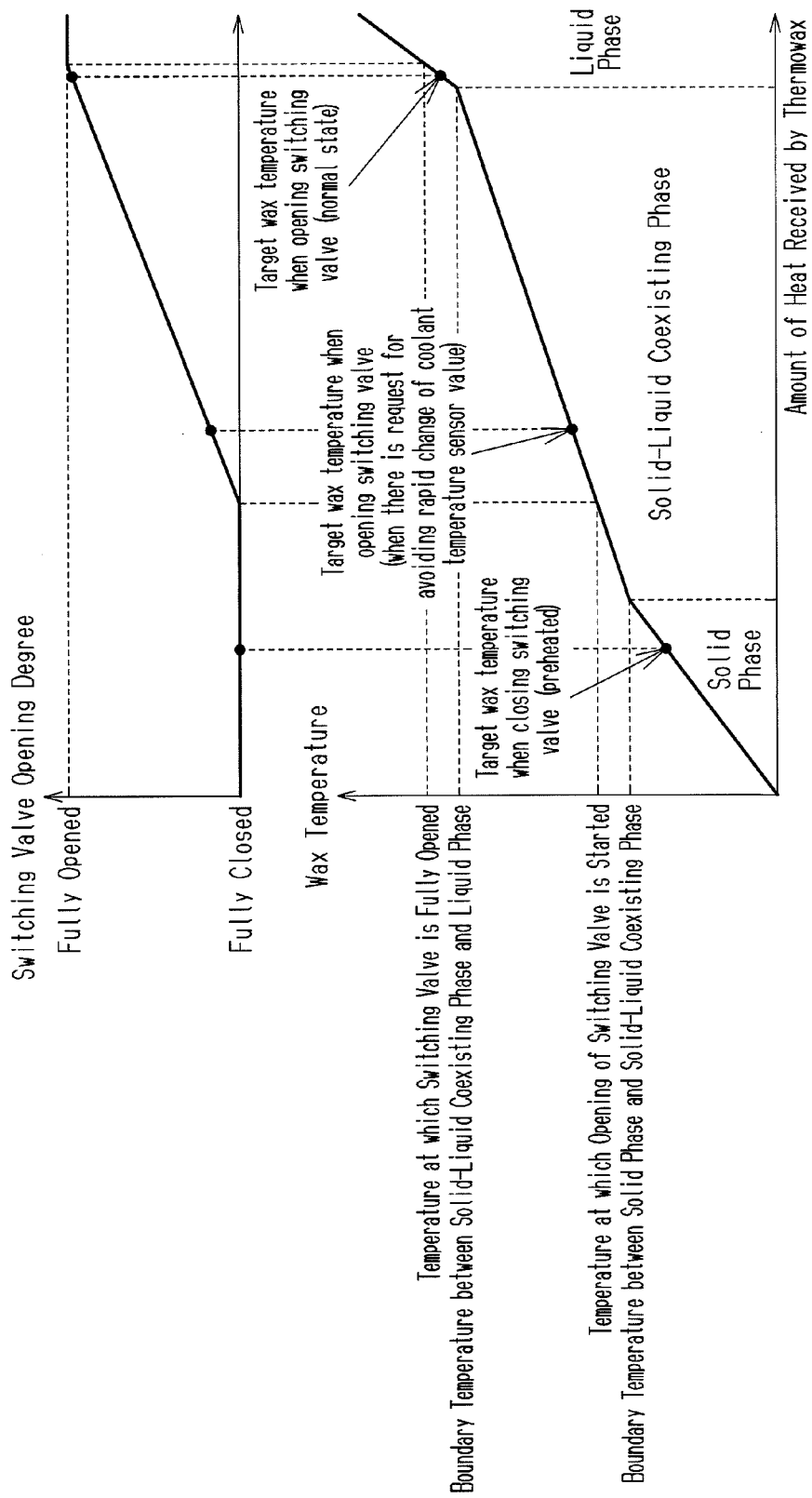
FIG. 7 A graph showing the setting manner of the target wax temperature according to the first embodiment.

FIG. 6 shows the relationship between the amount of heat received by the thermowax with respect to the opening degree of the switching valve 8 and the temperature of the thermowax. As shown in FIG. 6, there is correlation between the opening degree of the switching valve 8 and the temperature of the thermowax. Thus, the switching valve 8 can be opened by a necessary opening degree by calculating the temperature of the thermowax necessary to open the switching valve 8 by a necessary opening degree (target switching valve opening degree), setting the calculated temperature as the target wax temperature, and controlling the heating state of the heater 9 such that the temperature of the thermowax estimated in accordance with the thermal model becomes equal to the target wax temperature. As shown in FIG. 6, the switching valve 8 starts to open at the thermowax temperature slightly higher than the temperature at the boundary between the solid phase and the solid-liquid coexisting phase of the thermowax, and is fully opened at the thermowax temperature slightly higher than the temperature at the boundary between the solid-liquid coexisting phase and the liquid phase of the thermowax.

The opening and closing control of the switching valve 8 based on the thermostat temperature according to this embodiment is performed in the following manner. In this embodiment, setting of the target wax temperature under the following conditions is performed in the manner shown in FIG. 7.

(a) When Switching Valve 8 is Fully Opened

When performing heating control of the heater 9 based on the estimate temperature of the thermowax as described above, in this embodiment, the target wax temperature when there is a request for fully opening the switching valve 8 is set to or slightly lower than the temperature of the thermowax when the switching valve 8 is fully opened to avoid overheating of the thermowax by the heater 9 in a suitable manner.

(b) When the Switching Valve 8 is Fully Closed

If the heater 9 is not energized, the switching valve 8 is kept fully closed. However, even when the switching valve 8 is fully closed, if the engine coolant in the cylinder head is boiling, it is necessary to urgently open the switching valve 8 so that circulation of the engine coolant in the engine is started and boiling of the engine coolant is avoided. In this embodiment, to ensure the valve opening response of the switching valve 8 in the case as described above, the electronic control unit 12 sets the target wax temperature at the time when the switching valve 8 is fully closed to a value corresponding to a temperature of the thermowax that exists immediately before the opening of the switching valve 8 is started. That is, by preheating the thermowax, the switching valve 8 is held in a standby state where the switching valve 8 can promptly open. If the thermowax is preheated to any level, the operation response of the switching valve 8 from a valve closed state to a valve opened state is improved as compared to a case where the thermowax is not preheated. Thus, the amount of heat received becomes greater than 0, and the operation response of the switching valve 8 from the valve closed state to the valve opened state is improved only by setting the target value of the switching valve while being closed to a value lower than the temperature at which opening of the switching valve is started.

(c) When Switching Valve 8 is Shifted from Valve Closed State to Valve Opened State If the switching valve 8 is abruptly opened, the temperature of the engine coolant around the coolant temperature sensor 13 is rapidly changed, and might hinder various types of engine controls based on the detection result of the engine coolant temperature. In such a case also, by holding the target wax temperature to the temperature of the thermowax at which the switching valve 8 has a minute opening degree for a certain period of time, and then setting the target wax temperature to the thermowax temperature at which the switching valve 8 is fully opened, the switching valve 8 is gradually opened, and the value of the engine coolant temperature sensor is prevented from being abruptly changed.

The switching valve 8 needs to be promptly opened to prevent boiling of the engine coolant in the cylinder head. In such a case, the switching valve 8 is not held at the minute opening degree for the certain period of time, but is immediately set to the target wax temperature when there is a request for fully opening the switching valve 8.

Figure 8:
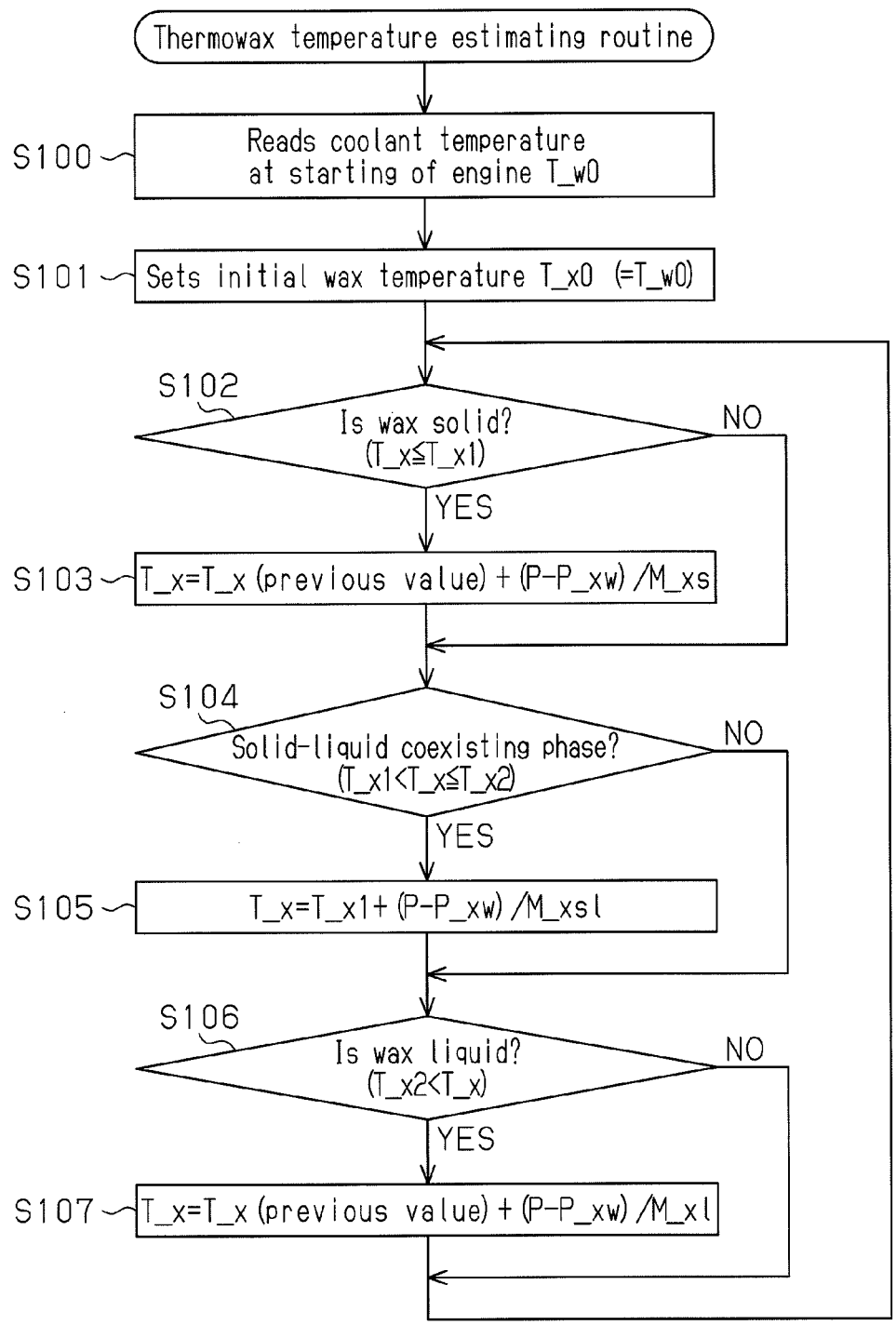
FIG. 8 A flowchart showing a wax temperature estimating routine according to the first embodiment.

FIG. 8 shows a flowchart of a wax temperature estimating routine according to this embodiment. The process of this routine is started by the electronic control unit 12 at the starting of the engine 3.

When this routine is started, the electronic control unit 12 first reads the coolant temperature T_w0 at the starting of the engine 3 in step S100. The electronic control unit 12 then sets the coolant temperature T_w0 at the starting of the engine 3 as an initial wax temperature T_x0 in step S101.

In the subsequent step S102, the electronic control unit 12 determines whether the thermowax is in the solid phase. The determination is made based on whether the estimate temperature T_x of the thermowax is less than or equal to a boundary temperature T_x1 between the solid phase and the solid-liquid coexisting phase of the thermowax.

If the thermowax is solid (if the decision outcome of S102 is positive), the electronic control unit 12 updates the value of the estimate temperature T_x of the thermowax according to the following equation (1) in step S103.

$$T\_x = T\_x(\text{previous value}) + (P - P\_xw)/M\_xs \quad (1)$$

where P in the equation (1) is the input heat amount of the heater 9, P_xw is the amount of heat transfer from the thermowax to the engine coolant, and M_xs is the solid thermal capacity of the thermowax.

In the subsequent step S104, the electronic control unit 12 determines whether the thermowax at that time is in the solid-liquid coexisting phase. The determination is made based on whether the estimate temperature T_x of the thermowax is greater than the boundary temperature T_x1 between the solid phase and the solid-liquid coexisting phase of the thermowax, and is less than or equal to a boundary temperature T_x2 between the solid-liquid coexisting phase and the liquid phase.

If the thermowax is in the solid-liquid coexisting phase (if the decision outcome of S104 is positive), the electronic control unit 12 updates the value of the estimate temperature T_x of the thermowax according to the following equation (2) in step S105.

$$T\_x = T\_x(\text{previous value}) + (P - P\_xw)/M\_xsl \quad (2)$$

Where M_xsl in the equation (2) is the solid-liquid coexisting thermal capacity of the thermowax.

In the subsequent step S106, the electronic control unit 12 determines whether the current thermowax is in the liquid phase. The determination is made based on whether the estimate temperature T_x of the thermowax is greater than the boundary temperature T_x2 between the solid-liquid coexisting phase and the liquid phase.

If the thermowax is in the liquid phase (if the decision outcome of S106 is positive), the electronic control unit 12 updates the value of the estimate temperature T_x of the thermowax in accordance with the following equation (3) in step S107.

$$T\_X = T\_X(\text{previous value}) + (P - P\_xw)/M\_xl \quad (3)$$

Where M_xl in the equation (3) is the liquid thermal capacity of the thermowax.

As described above, after updating the estimate temperature T_x of the thermowax, the electronic control unit 12 returns to step S102 in the next control cycle, and repeatedly updates the estimate temperature T_x.

Figure 9:
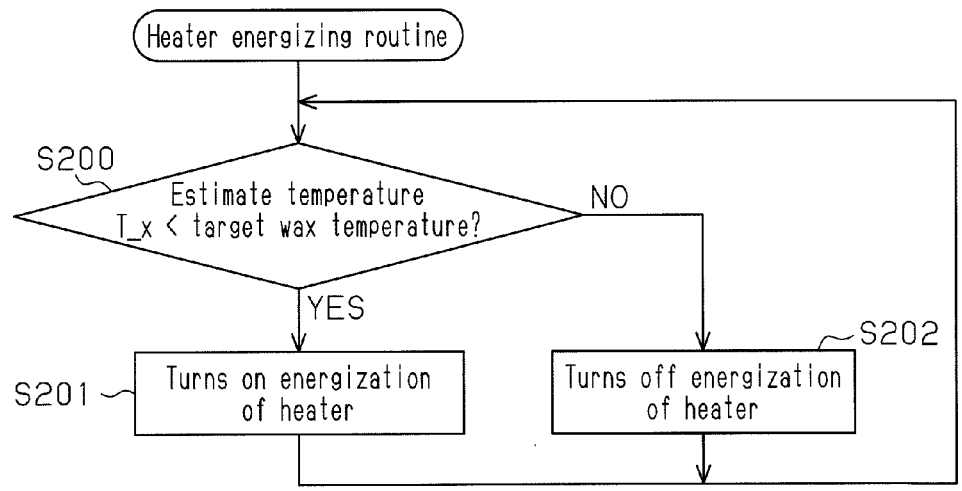
FIG. 9 A flowchart showing a heater energizing routine according to the first embodiment.

FIG. 9 shows a flowchart of a heater energizing routine according to this embodiment. The process of this routine is repeatedly performed per predetermined number of control cycles by the electronic control unit 12.

When this routine is started, the electronic control unit 12 determines whether the estimate temperature T_x of the thermowax is lower than the target wax temperature set in a target wax temperature setting routine in step S200 as described below. Then, if the estimate temperature T_x is lower than the target wax temperature (if the decision outcome of S201 is positive), the electronic control unit 12 turns on energization of the heater 9 in step S201. If such is not the case (if the decision outcome of S201 is negative), the electronic control unit 12 turns off energization of the heater 9 in step S202, and terminates the process of the current routine. In this embodiment, when the estimate temperature T_x of the thermowax is lower than the target wax temperature, the heater 9 heats the thermowax, and if such is not the case, heating is stopped.

Figure 10:
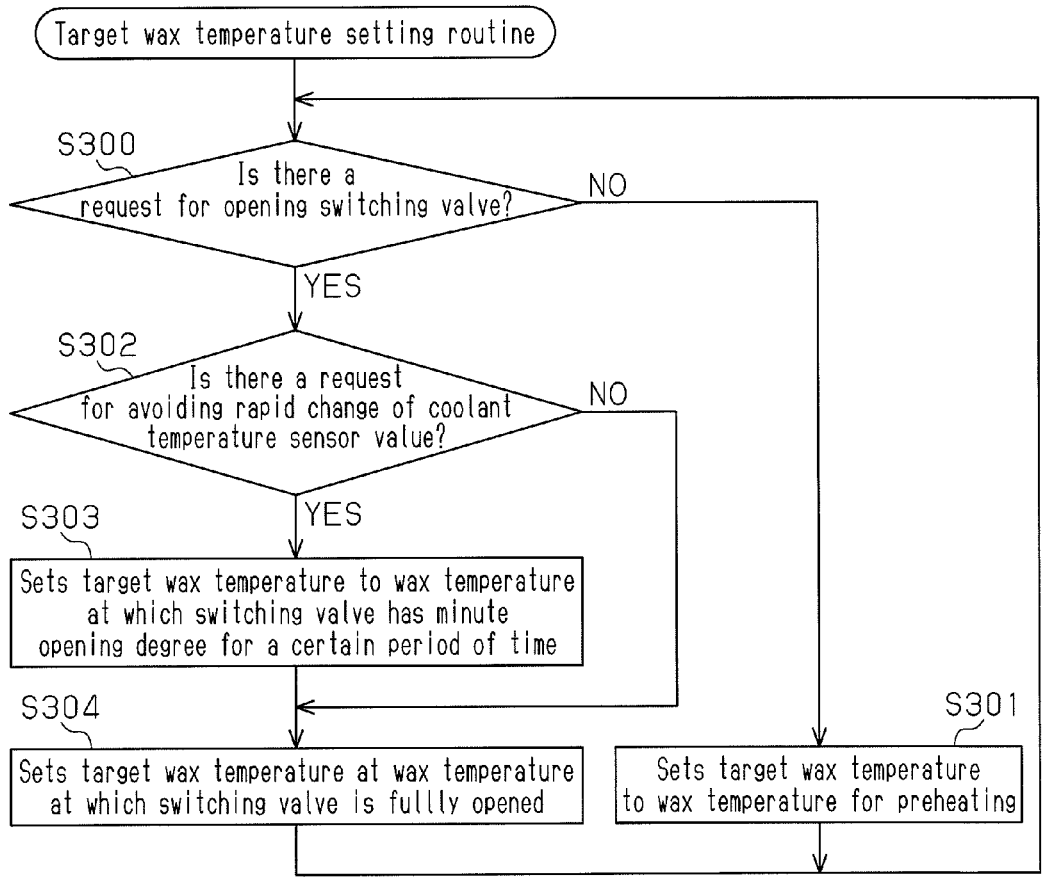
FIG. 10 A flowchart showing a target wax temperature setting routine according to the first embodiment.

FIG. 10 shows a flowchart of the target wax temperature setting routine according to this embodiment. The process of this routine is started immediately after starting the engine 3 by the electronic control unit 12.

When this routine is started, the electronic control unit 12 first checks whether there is a request for opening the switching valve 8 in step S300. If there is no opening request (if the decision outcome of S300 is negative), the electronic control unit 12 proceeds to step S301, and sets the target wax temperature to a wax temperature for preheating in step S301, and returns to the process of step S300 after the predetermined control cycles.

If there is the opening request (if the decision outcome of S300 is positive), the electronic control unit 12 checks whether there is a request for avoiding abrupt change in the value of the coolant temperature sensor. That is, the electronic control unit 12 determines whether the switching valve 8 needs to be urgently opened to avoid boiling.

If there is a request for avoiding abrupt change in the value of the coolant temperature sensor (if the decision outcome of S302 is positive), the electronic control unit 12 sets the target wax temperature to the wax temperature at which the switching valve 8 has the minute opening degree for a certain period of time in step S303 and then sets the target wax temperature to the wax temperature at which the switching valve 8 is fully opened in step S304. The electronic control unit 12 then returns to the process of step S300 after the predetermined control cycles.

If there is no request for avoiding abrupt change in the coolant temperature sensor value (if the decision outcome of S302 is negative), the electronic control unit 12 immediately proceeds to step S304, and sets the target wax temperature to the wax temperature at which the switching valve 8 is fully opened. Subsequently, the electronic control unit 12 returns to the process of step S300 after the predetermined control cycles.

In this embodiment described above, the heater 9 corresponds to the heating section. Also, in this embodiment, the electronic control unit 12 executes processes performed by a target value setting section, a wax temperature estimating section, and a control section.

This embodiment has the following advantages.

(1) According to this embodiment, in the vehicle equipped with the thermowax switching valve 8, which includes the heater 9 for heating the thermowax and is selectively opened and closed by melting and solidification of the thermowax, the electronic control unit 12 controls the heating state of the heater 9 taking into account the variation of the thermal capacity accompanying phase transition of the thermowax. More specifically, the electronic control unit 12 executes the following:

setting of the target wax temperature, which is the target value of the temperature of the thermowax;

computing the amount of heat received by the thermowax based on the amount of heat transferred from the heater 9 to the thermowax (input heat amount P) and the amount of heat P_xw transferred from the thermowax to the engine coolant around the switching valve 8, and estimating the temperature of the thermowax (estimate temperature T_x) based on the amount of heat received and the thermal capacity of the thermowax;

controlling the heater 9 such that the estimate temperature T_x of the thermowax becomes equal to the target wax temperature; and changing the value of the thermal capacity used for computing the estimate temperature T_x in accordance with the variation of the estimate temperature T_x of the thermowax across the phase transition points of the thermowax.

The amount of heat received by the thermowax of the above-mentioned thermowax switching valve 8 is calculated as a value (P−P_xw) obtained by dividing the amount of heat (P_xw) transferred to the fluid around the switching valve from the thermowax from the amount of heat (input heat amount P) transferred from the heater 9 to the thermowax. By dividing the amount of heat received by the thermowax by the thermal capacity, the amount of temperature variation of the thermowax is calculated, and the thermowax temperature can be calculated from the result. The opening and closing of the thermowax switching valve 8 involves phase transition of the thermowax from the solid phase to the solid-liquid coexisting phase and the liquid phase, and the thermal capacity of the thermowax is changed in accordance with the phase transition. In this respect, according to this embodiment, the value of the thermal capacity is changed in accordance with the variation of the estimate temperature T_x of the thermowax across the phase transition points of the thermowax, and the thermowax temperature is estimated using the thermal capacity appropriate for the phase transition of the thermowax. Thus, in the control device for a vehicle according to this embodiment, the thermowax temperature is accurately grasped, and the switching valve operated by heating the thermowax is controlled in a suitable manner.

(2) In this embodiment, the target wax temperature when there is a request for fully opening the switching valve 8 is set to the temperature slightly lower than the thermowax temperature at which the switching valve 8 is fully opened. Thus, overheating of the thermowax by the heater 9 is avoided in a suitable manner.

(3) In this embodiment, when opening the switching valve 8 when there is a request for reducing the valve opening speed, the target wax temperature is held to the thermowax temperature at which the switching valve 8 has the minute opening degree for the certain period of time. Thereafter, the target value is set to the thermowax temperature at which the switching valve 8 is fully opened. Thus, the switching valve 8 is gradually opened, and abrupt temperature change of the fluid is prevented.

(4) In this embodiment, the target wax temperature when the switching valve 8 is fully closed is set to the value corresponding to a temperature of the thermowax that exists immediately before the switching valve 8 starts to open. This ensures the valve opening response of the switching valve 8.

(5) In this embodiment, when the estimate temperature T_x of the thermowax is lower than the target wax temperature, the thermowax is heated by the heater 9, and if such is not the case, heating is stopped. Thus, the heater 9 is easily controlled based on the estimate temperature of the thermowax.

(6) In this embodiment, the thermal capacity of the case of the switching valve 8 in combination with the thermowax is used as the thermal capacity used to compute the amount of temperature variation of the thermowax. Thus, even if the thermal capacity of the case with respect to the thermal capacity of the thermowax is as great as it cannot be ignored, the thermowax temperature is accurately estimated.

(7) In this embodiment, since the switching valve 8 is controlled in a suitable manner by accurately grasping the thermowax temperature, deterioration due to carbonization and of the rubber seal and the grease inside the switching valve 8 due to overheating are prevented in a suitable manner.

Second Embodiment

Subsequently, a control device for a vehicle according to a second embodiment of the present invention will now be described with reference to FIGS. 11 and 12. In this embodiment, the setting manner of the target wax temperature is changed, but other parts are common to the first embodiment.

Hysteresis that cannot be ignored exists in the relationship between the thermowax temperature and the switching valve opening degree. That is, there might be a great difference between the thermowax temperature at which the switching valve opening degree of a predetermined opening degree X is obtained when the opening degree of the switching valve 8 is being changed in the valve opening direction, and the thermowax temperature at which the switching valve opening degree of a predetermined opening degree X is obtained when the opening degree of the switching valve 8 is being changed in the valve closing direction. In such a case also, even if the target opening degree of the switching valve 8 is the same, the target wax temperature may be set to different values in the case where the switching valve opening degree is changed in the valve opening direction to achieve the target opening degree, and in the case where the switching valve opening degree is changed in the valve closing direction to achieve the target opening degree. In this manner, the opening degree of the switching valve 8 is controlled in a suitable manner.

Figure 11:
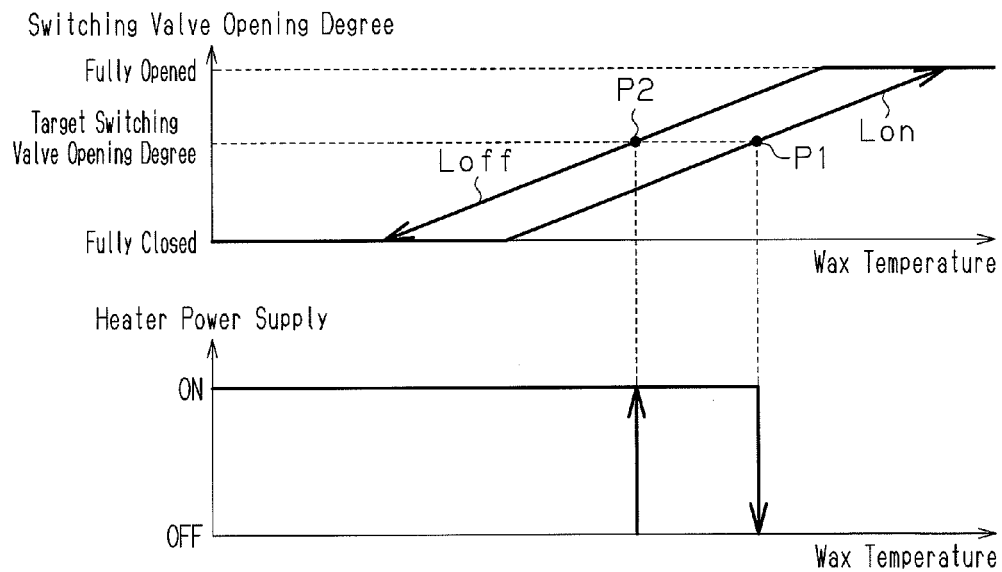
FIG. 11 A graph showing the setting manner of a target wax temperature according to a second embodiment of the present invention.

More specifically, in this embodiment, even if the target switching valve opening degree is the same, different target wax temperatures are used in the case where the switching valve 8 is activated in the valve opening direction by turning on energization, and in the case where the switching valve 8 is activated in the valve closing direction by turning off energization as shown in FIG. 11. That is, when activating the switching valve 8 in the valve opening direction by turning on energization, the thermowax temperature at an intersection P1 of the target switching valve opening degree and an operation line Lon of the switching valve 8 when energization is on is set as the target wax temperature, and the thermowax temperature at an intersection P2 of the target switching valve opening degree and an operation line Loff of the switching valve 8 when energization is off is set as the target wax temperature. Thus, even when there is hysteresis in the relationship between the thermowax temperature and the switching valve opening degree, the switching valve opening degree is controlled in a suitable manner based on the thermowax temperature.

Figure 12:
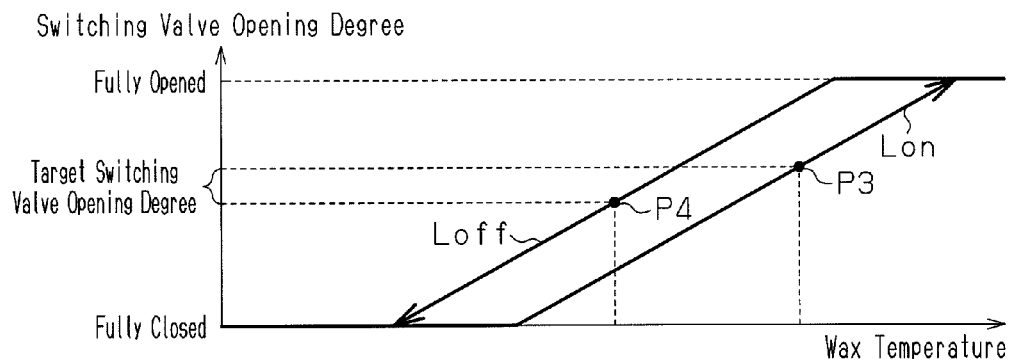
FIG. 12 A graph showing the setting manner of the target wax temperature in a case where the target switching valve opening degree is set with a certain margin.

In a case where the target switching valve opening degree is set with a certain margin as shown in FIG. 12, when energization is turned on so that the switching valve 8 is activated in the valve opening direction, the thermowax temperature at an intersection P3 of the upper limit value of the target switching valve opening degree and the operation line Lon of the switching valve 8 when energization is on is set as the target wax temperature. Also, when the switching valve 8 is activated in the valve opening direction by turning on energization, the thermowax temperature at an intersection P4 of the lower limit value of the target switching valve opening degree and the operation line Loff of the switching valve 8 when energization is off is set as the target wax temperature.

Third Embodiment

Figure 13:
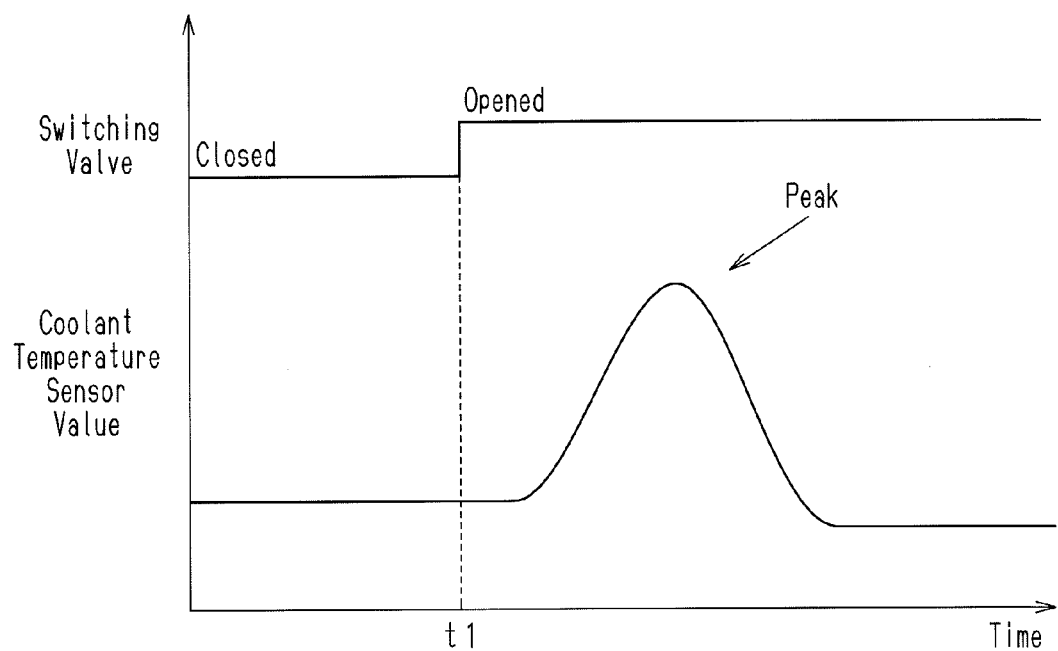
FIG. 13 A graph showing changes of a sensor value of the coolant temperature sensor before and after opening the switching valve.

Subsequently, a control device for a vehicle according to a second embodiment of the present invention will now be described with reference to FIGS. 13 and 14. This embodiment is common to the above-mentioned embodiments except that a modification and learning process of the thermal capacity of the thermowax is performed.

The thermal capacity of the thermowax of the switching valve 8 might vary from one unit to another due to change with time and individual differences. In such a case, the thermal capacity used to estimate the thermowax temperature differs from the actual thermal capacity of the thermowax, and the thermowax temperature cannot be accurately estimated.

In this embodiment, an opened state of the switching valve 8 is detected, and the thermal capacity is modified in accordance with the difference between the estimate temperature of the thermowax at the time when opening of the switching valve 8 is detected and the thermowax temperature at which the switching valve actually opens. Accordingly, the variation of the thermal capacity from one unit to another is modified and learned, and the thermowax temperature is accurately estimated.

The an opened state of the switching valve 8 is detected in the following manner.

As described above, the first conduit 2 of the coolant circuit of the vehicle according to this embodiment is formed to pass through the cylinder block of the engine 3, and then through the cylinder head. Also, the coolant temperature sensor 13 is arranged in the vicinity of the coolant outlet of the cylinder head. In this case, when the switching valve 8 in the fully closed state is opened and circulation of the engine coolant in the engine 3 is started, first, the engine coolant located in the cylinder head passes through the mounting position of the coolant temperature sensor 13. Subsequently, the engine coolant located in the cylinder block passes through the mounting position of the coolant temperature sensor 13.

When circulation of the engine coolant is stopped, the temperature of the engine coolant in the cylinder head becomes higher than that of the engine coolant in the cylinder block. Therefore, the sensor value of the coolant temperature sensor 13 before and after the switching valve 8 is opened reaches a peak immediately after the switching valve 8 is opened as shown in FIG. 13. Since the peak does not appear at times other than when the switching valve 8 is opened, the opened state of the switching valve 8 can be detected. That is, in this embodiment, the electronic control unit 12 determines that the switching valve 8 is opened in accordance with the appearance of the peak of the sensor value of the coolant temperature sensor 13.

Figure 14:
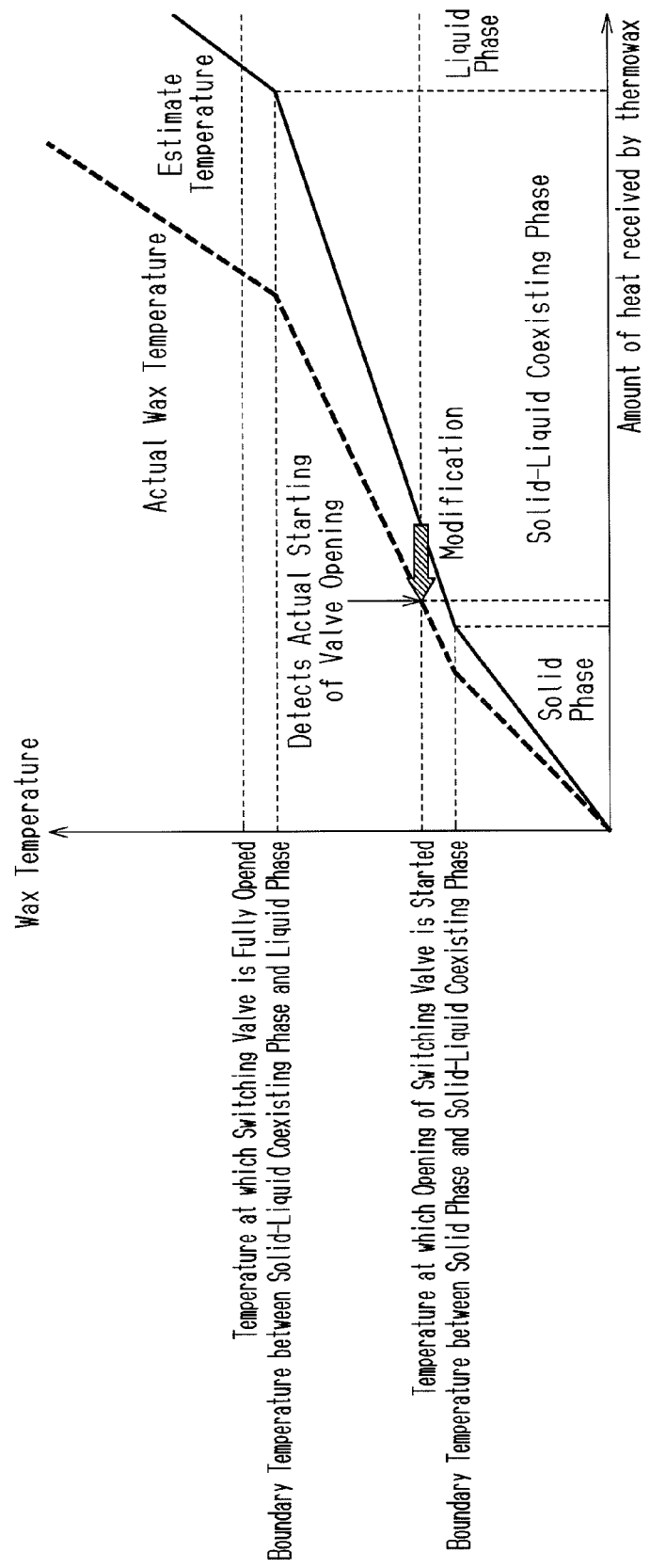
FIG. 14 A graph showing the relationship between the amount of heat received by the thermowax with respect to the wax temperatures when there is a difference between the calculated wax temperature and the actual wax temperature.

FIG. 14 shows the relationship between the amount of heat received by the thermowax with respect to the calculated wax temperature, that is, the estimate temperature $T\_x$ and the actual wax temperature when there is a difference between them. Such a difference is generated when the thermal capacities ($M\_xs$, $M\_xsl$, $M\_xl$) used to calculate the estimate temperature $T\_x$ separate from the actual values.

If the thermowax is solid before starting to open the valve, the thermowax temperature (estimate temperature $T\_x$) is represented by the following equation (4).

$$T\_x = T\_x0 + \int (P - P\_xw) dt / M\_xs \quad (4)$$

where $T\_x0$ is the initial temperature of the thermowax, P is the input heat amount of the heater 9, $P\_xw$ is the amount of heat transferred from the thermowax to the engine coolant, and $M\_xs$ is the solid thermal capacity of the thermowax.

The amount of heat received by the thermowax until an opening state of the switching valve 8 is detected is represented by $\int(P-P\_xw)dt/M\_xs$. Thus, the actual solid thermal capacity $M\_xs'$ of the thermowax has a value that satisfies the following equation (5).

$$\text{Valve opening starting temperature of switching valve} = T\_x0 + \int(P-P\_xw)dT/M\_xs' \quad (5)$$

Therefore, an appropriate thermowax temperature can be estimated by modifying the solid thermal capacity of the thermowax to a value $M\_xs'$ that satisfies the above equation (5).

While the solid thermal capacity $M\_xs$ of the thermowax is very important for determining an opened state of the switching valve 8, the error in the solid-liquid coexisting thermal capacity $M\_xsl$ and the liquid thermal capacity $M\_xl$ influence the opening degree of the switching valve 8 by a relatively small degree. Therefore, in the third embodiment, only the modification and learning of the solid thermal capacity $M\_xs$ is performed to reduce calculation load. If necessary, of course, $M\_xsl$ and $M\_xl$ may be modified by multiplying by $M\_xs'/M\_xs$.

According to this embodiment, the thermowax temperature is accurately estimated regardless of the variation of the thermal capacity of the thermowax.

In this embodiment, the electronic control unit 12 is configured to perform processes as a detection section for detecting an opened state of the switching valve 8, and a modification section for modifying the thermal capacity in accordance with the difference between the estimate temperature $T\_x$ of the thermowax when valve opening of the switching valve 8 is detected and the thermowax temperature at which the switching valve 8 is actually opened.

Each of the above embodiments may be modified as follows.

In the above embodiments, the sensor value of the coolant temperature sensor 13 is used as the coolant temperature $T\_w$ of the engine coolant used for computing the amount of heat $P\_xw$ transferred from the thermowax to the engine coolant. However, if the switching valve 8 and the coolant temperature sensor 13 are arranged apart from each other and circulation of the engine coolant in the engine 3 is stopped, the sensor value of the coolant temperature sensor 13 and the temperature of the engine coolant around the switching valve 8 might be different. In this case, a value obtained by multiplying the total fuel amount ga of the engine 3 by a certain coefficient K1 represents the temperature increase of the engine coolant around the switching valve 8 by the heat of the engine 3, and the coolant temperature around the switching valve 8 can be computed by the following equation (6).

$$T\_w = T\_w0 + K1 \times \int ga\, dt \quad (6)$$

where $T\_w0$ in the equation (6) is the initial coolant temperature, that is, the coolant temperature sensor value at the beginning of the engine start-up. Also, the value obtained by multiplying the total fuel amount ga by a certain coefficient K2 may be used as a value corresponding to the difference between the coolant temperature sensor value and the engine coolant temperature around the switching valve 8, and the coolant temperature around the switching valve 8 may be computed by the following equation (7).

$$T\_w = Thw + K2 \times \int ga\, dt \quad (7)$$

where Thw in the equation (7) is the coolant temperature sensor value.

In the third embodiment, the valve opening of the switching valve 8 is detected by the appearance of the peak of the coolant temperature sensor value, but the valve opening of the switching valve 8 may be detected by another method. For example, an opening degree sensor may be provided in the switching valve 8, and the valve opening of the switching valve 8 may be directly detected based on the detection result of the sensor. Alternatively, a sensor for detecting the water flow in the third conduit 11 may be provided, and the valve opening of the switching valve 8 may be indirectly detected by the presence and absence of the water flow in the third conduit 11.

In the above embodiments, the thermal capacity of the case of the switching valve 8 in combination with the thermowax is used as the thermal capacities (M_xs, M_xsl, M_xl), but if the thermal capacity of the case is small and its influence can be ignored, the thermal capacity of only the thermowax may be used.

In the above embodiments, after holding the target wax temperature to the thermowax temperature at which the switching valve 8 has the minute opening degree for the certain period of time, the target wax temperature is set to the thermowax temperature at which the switching valve 8 is fully opened to avoid rapid change of the coolant temperature sensor value. Of course, in a case where rapid change of the coolant temperature sensor value does not cause a problem, or in a case where quick response of an opening state of the switching valve is required, the target wax temperature may be set to the thermowax temperature at which the switching valve 8 is fully opened from the beginning.

In the above embodiments, the heater 9 is preheated to ensure the opening response of the switching valve 8. However, preheating may not be performed if high valve opening response is not required, and electric consumption during standby may be reduced.

In the above embodiments, the target wax temperature is set based on three cases including when the switching valve 8 is fully opened, when fully closed, and when transferring from the closed state to the opened state. However, if more precise switching valve opening degree control is required, a finer target wax temperature setting may be performed.

In the above embodiments, the heating state of the heater 9 is controlled only by turning on and off energization. However, if more precise switching valve opening degree control is required, the amount of energization of the heater 9 may be finely controlled.

A different model from the above embodiments may be employed as the thermal model associated with computation of the estimate temperature of the thermowax.

As the heating section for heating the thermowax of the switching valve 8, any heating device such as a hot wire heater, a PTC heater, and a heat pump may be used.

In the above embodiments, the present invention is embodied in the control of the switching valve 8, which switches the presence and absence of the water flow in the engine 3. However the present invention may be embodied in the control of a switching valve other than that in the coolant circuit of the vehicle, such as a valve that switches the presence and absence of water flow in the radiator. Also, the present invention may be embodied in the control of a switching valve located in places other than the coolant circuit, such as a valve provided in a hydraulic circuit of the engine and that switches the oil flow in the hydraulic circuit.

DESCRIPTION OF THE REFERENCE NUMERALS

1 . . . Electric Water Pump, 2 . . . First Conduit, 3 . . . Engine, 4 . . . EGR Cooler, 5 . . . Heater Core, 6 . . . Second Conduit, 7 . . . Thermostat, 8 . . . Thermowax Switching Valve, 9 . . . Heater (Heating Section), 10 . . . Radiator, 11 . . . Third Conduit, 12 . . . Electronic Control Unit (Target Value Setting Section, Wax Temperature Estimating Section, Control Section), 13 . . . Coolant Temperature Sensor.

The invention claimed is:

1. A control device for a vehicle, the vehicle including a thermowax switching valve, which includes a heating section for heating thermowax and is selectively opened and closed by melting and solidification of the thermowax, the control device comprising:
   a target value setting section, which sets a target value of the temperature of the thermowax;
   a wax temperature estimating section, which computes the amount of heat received by the thermowax based on the amount of heat transferred from the heating section to the thermowax and the amount of heat transferred from the thermowax to a fluid around the switching valve, and which estimates the temperature of the thermowax based on the amount of heat received and the thermal capacity of the thermowax; and
   a control section for controlling the heating section such that the estimated temperature of the thermowax becomes equal to the target value,
   wherein the wax temperature estimating section changes the value of the thermal capacity in accordance with variation of the estimate temperature of the thermowax across phase transition points of the thermowax.

2. The control device for a vehicle according to claim 1, wherein the target value setting section sets the target value when there is a request for opening the switching valve to a temperature less than or equal to the temperature of the thermowax at which the switching valve is fully opened.

3. The control device for a vehicle according to claim 1, wherein, in a case of opening the switching valve when there is a request to reduce the valve opening speed, the target value setting section holds the target value to the temperature of the thermowax at which the switching valve has a minute opening degree for a certain period of time and then sets the target value to the temperature of the thermowax at which the switching valve is fully opened.

4. The control device for a vehicle according to claim 1, wherein the target value setting section sets the target value when the switching valve is closed to a value at which the amount of heat received by the thermowax becomes greater than 0 and to a value that is lower than the temperature at which opening of the switching valve is started.

5. The control device for a vehicle according to claim 1, wherein the target value setting section sets the target value when the switching valve is closed to a value corresponding to a temperature of the thermowax that exists immediately before opening of the switching valve is started.

6. The control device for a vehicle according to claim 1, wherein, even if the opening degree of the switching valve is set to the same target opening degree, the target value is set to different values in a case where the opening degree of the switching valve is changed in a valve opening direction to achieve the target opening degree, and in a case where the opening degree of the switching valve is changed in a valve closing direction to achieve the target opening degree.

7. The control device for a vehicle according to claim 1, further comprising:
   a detection section for detecting an opened state of the switching valve; and
   a modification section, which modifies the thermal capacity in accordance with the difference between the estimate temperature of the thermowax when detecting an opened state of the switching valve and the temperature of the thermowax at which the switching valve is actually opened.

8. The control device for a vehicle according to claim 1, wherein, when the estimate temperature of the thermowax is lower than the target value, the control section heats the thermowax by the heating section, and if such is not the case, the control section stops heating.

9. The control device for a vehicle according to claim 1, wherein the thermal capacity is calculated as the thermal capacity of a combination of the switching valve and the thermowax.

10. The control device for a vehicle according to claim 1, wherein the switching valve is located in a coolant circuit that circulates an engine coolant.

11. The control device for a vehicle according to claim 10, wherein the switching valve switches between circulation and stopping of the coolant inside the engine.

* * * * *